UNITED STATES PATENT OFFICE.

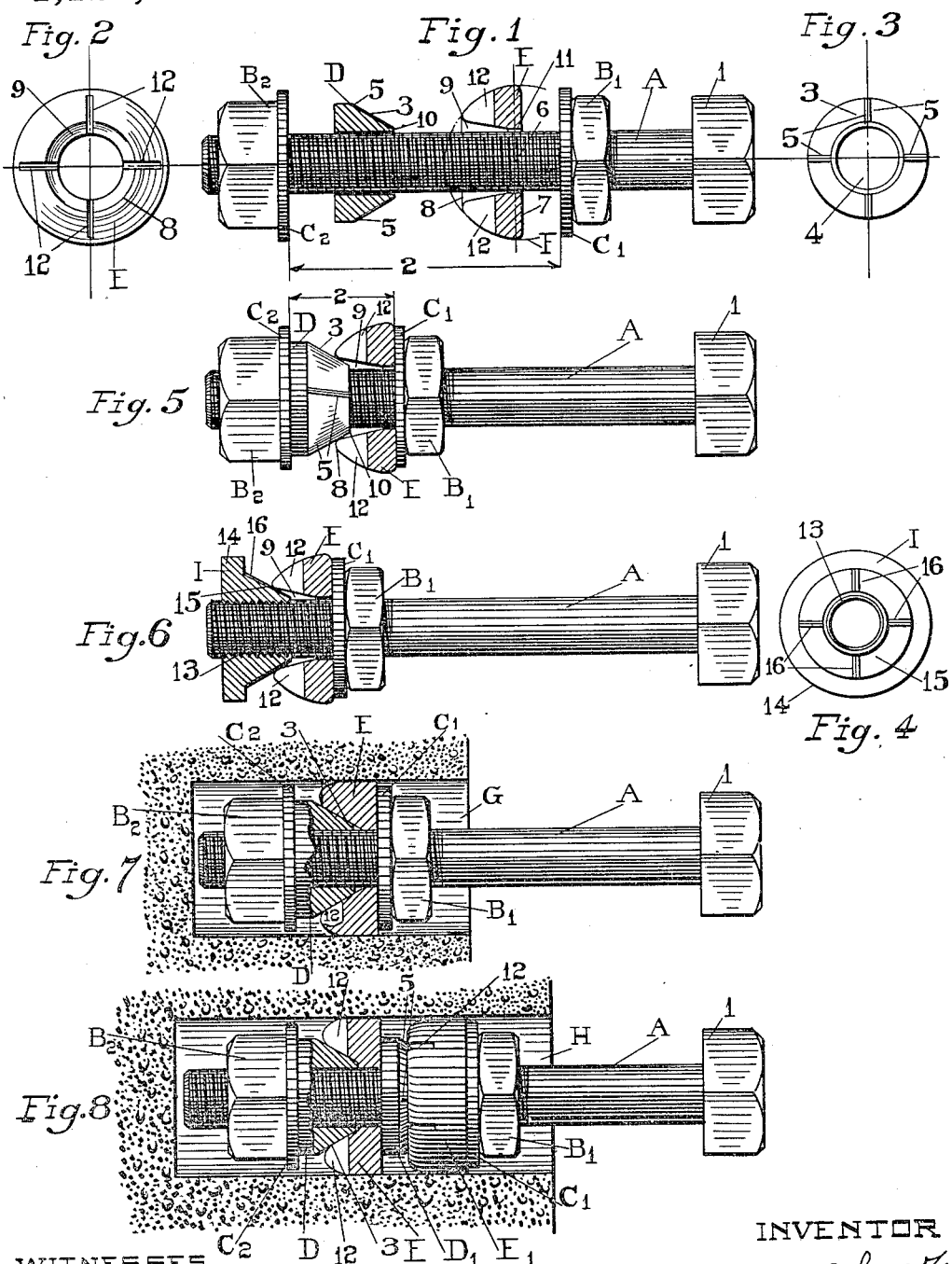

GABRIEL E. ROHMER, OF ELMHURST, NEW YORK, ASSIGNOR, BY MESNE ASSIGNMENTS, TO CINCH EXPANSION BOLT & ENGINEERING COMPANY, OF NEW YORK, N. Y., A CORPORATION OF NEW YORK.

EXPANSION-BOLT.

1,120,657.   Specification of Letters Patent.   Patented Dec. 8, 1914.

Application filed January 5, 1911, Serial No. 601,021. Renewed March 14, 1914. Serial No. 824,785.

*To all whom it may concern:*

Be it known that I, GABRIEL E. ROHMER, a citizen of the United States, residing at Elmhurst, in the county of Queens and State of New York, have invented a new and useful Expansion-Bolt, of which the following is a specification.

My invention relates to expansion bolts and has for its object to provide an anchorage in which a relatively soft member is forced against the inside wall of a masonry hole in which the device is intended to be used, thus utilizing the packing and adhesive properties of the material, which, by filling up the open interstices of the stone, insures a perfect anchorage. The invention is shown in the drawings accompanying this specification, and will be more fully described hereinafter and finally pointed out in the claims.

I attain these objects by the device illustrated in the accompanying drawing, in which—

Figure 1 is a longitudinal section of the anchor bolt and expansion device; Figs. 2, 3 and 4 respectively, a plan view of the expanding member, expansible member and threaded collar, Figs. 5 and 6 are different illustrations of this expansion bolt ready to be used, while Figs. 7 and 8 show my invention applied to masonry holes, Figs. 6 and 8 showing modified forms.

Similar letters of reference indicate corresponding parts throughout the several figures of the drawing.

Referring to the drawing, the bolt A, is provided with two sets of nuts and hard metal washers, respectively, $B^1$, $B^2$, $C^1$, $C^2$, such as usually found on the market. The bolt A is an ordinary square head bolt with a machine screw thread. On the bolt A is placed an expanding member D of hard metal, an expansible member E of rather soft metal. The first nut $B^1$, is screwed to the bolt A to the end of the thread near the bolt head 1, and thereby is prevented from advancing. The iron washer $C^1$, is adjacent to the nut $B^1$ and inside of the threaded body of the bolt A. The other nut $B^2$, is also screwed to the bolt A, but at its other threaded extremity, and adjacent to it and placed before the nut $B^2$, is the iron washer $C^2$, in such a manner as to have the two iron washers $C^1$, $C^2$, face to face.

The expanding member is cast of metal with one of its ends appropriately beveled, see 3, shown clearly in Fig. 3, and its inside hole 4 (Fig. 3) is of a diameter slightly larger than the outside diameter of the bolt A. In the embodiment shown in the drawing, four ribs 5 are also cast on the beveled end 3 of the expanding member D, their use being to engage the soft metal of the expansible member E when they come in contact with each other.

The expansible member E is made of lead or any other soft and suitable metal, its outside diameter being slightly smaller than the diameter of the hole into which the device is to be used, its shape being that of a portion of a sphere obtained by two planes running parallel to each other and cutting the sphere on each side of its center, as shown by 6 in Fig. 1. The rear face 7 of the expansible member E is plane, while its other side 8 is substantially the periphery of the largest diameter of the countersunk hole 9. That diameter 8 is slightly larger than the diameter, taken at 10, of the beveled end of the expanding member D, and such as to make the expanding member D and expanding member E to become male and female parts when they are contacting with each other, as shown in Fig. 5. The depth of the countersunk hole 9, is equal to three fourths of the thickness of member E, the remaining one fourth forming a straight hole 11 which has a diameter substantially equal to the diameter of bolt A. On its countersunk hole side 8 the expansible member E is cast with four slots 12, equal in depth to half the thickness of the expansible member E, their use and purpose being to give to the expansible member E a greater expansion quality.

The operation of my improved device is as follows:—On a bolt A, the nut $B^1$ is screwed on as far as it will go toward the head 1 of the bolt A, then the iron washer $C^1$ is slipped on adjacent to it, successively the expansible member E and the expanding member D are placed on, in such a manner as to engage the countersunk hole 9 of the member E. Thereby, in the particular embodiment the ribs 5 of the expanding member D engage the member E and penetrate slightly therein and prevent the member from rotating. Then the washer C² is placed adjacent to the back end of the member D whereupon the nut B² is screwed in as far as the hands can work it in. Under the action of nut B² the member D is pushed into the countersunk hole 9 of the soft metal expansion member E and causes it to spread open. As the diameter of the member E is slightly larger than that of the hole G, it sometimes necessitates the use of a hammer to drive this expansion bolt into the hole. The wedge formed by the beveled end periphery 3 of the member D is forced into the countersunk hole 9 of the expansion member E and causes it to expand and flatten itself against the inside wall of the above referred to concrete hole G, thus insuring a perfect anchor.

It is obvious that as many expanding members D and expansible members E, as required, can be used with one bolt into one hole, but one bolt used in combination with two couples (see respectively, D, D¹, E, E¹, Fig. 8) provides an anchor of a strength sufficient for the usual attachment contrivances to be used.

While I advise the use of the set of nuts and washers B², C², these parts being readily found on the market, and of member D, for the sake of simplicity a hard metal beveled end collar I could be used, which would embody the characteristics and fulfil the same purpose as the three above named parts; the threaded hole 13 replacing the nut B², the base 14, offering a compression face similar to that of the iron washer C², and the beveled end 15, with its four ribs 16 forming the wedge periphery of the expanding member D, as shown in Figs. 4 and 6. By the coöperation of the expanding member and expansible member together with the iron washer C or base 14, a combination results consisting of an expanding member and an expansible member acting on a bolt, and having means movable along the bolt and relative thereto, and confining the expanding and expansible members therebetween. By the coöperation of the collar and expansion washer together with the iron washer C or base 14, a combination results consisting of a collar, an expansion washer acting on a bolt, and having means movable along the bolt and relative thereto, and confining the collar and expansion washer therebetween. I also do not limit myself to a bolt to be used in combination with this expansion device, but a hook, an eye bolt, a pipe hanger, or any other attachment contrivance could be used in combination with this invention, provided one of their ends is appropriately threaded to receive the different expansion organs composing this system.

I have described my invention as shown in several practical embodiments, but it is clear that changes may be made therein without departing from the spirit and scope of the invention as defined in the appended claims.

I claim:

1. An anchorage, comprising a bolt proper, an expanding member mounted on said bolt proper, an expansible member on said bolt proper and capable of being molded under pressure when entered by said expanding member, the diameter of the entering end of the expanding member initially in contact with said expansible member being less than the greatest diameter thereof, said expanding member successively increasing in diameter from said entering end, the thickness of the initially contacted portion of said expansible member being less than the greatest thickness thereof, the thickness and external diameter of said expansible member consecutively increasing away from the entering end of the expanding member, the entire expanded part of said expansible member contacting with said expanding member only at the completion of the expansion thereof.

2. An expansion bolt, comprising a bolt proper, an expansible member of a material capable of being molded under pressure and mounted on said bolt, said expansible member having an interior tapering bore, and an expanding member having a tapered form of greater inclination than said bore and held against longitudinal movement on the bolt, the diameter of the entering portion of said expanding member being adjacent the expansible member and substantially equal to the diameter of the entered end of the interior tapering bore of said expansible member.

3. An anchorage comprising a bolt proper, an expanding flaring member mounted on said bolt proper, an expansible member mounted on said bolt proper and capable of being molded under pressure when entered by said expanding member, means for holding said expansible member substantially stationary during the molding of the substance thereof, the entire active surface of said expanding member being inclined to the said bolt, said bolt having an abutment on that side of the expansible member remote from that end of the bolt upon which the pull is exerted, said abutment having a diameter substantially equal to the greatest diameter of said expansible member, the bore of said expansible member adjacent the entered end thereof being of greater diameter than said bolt proper.

4. An expansion bolt, comprising a bolt, an expansible member of a material capable of being molded under pressure and mounted on said bolt, said expansible member having the form of a portion of a sphere obtained by two planes running parallel to each other and cutting the sphere on each side of the center and having an interior bore, and an expanding member having a tapering form and held against longitudinal movement on the bolt, the smallest diameter of said expanding member being adjacent the expansible member, and being substantially equal to the diameter of the end of the interior bore of said expansible member.

5. An expansion bolt, comprising a bolt, an expansible member of a material capable of being molded under pressure and mounted on said bolt, the said expansible member having the form of a portion of a sphere obtained by two planes running parallel to each other and cutting the sphere on each side of the center and having an interior bore, an expanding member mounted on said bolt and held against longitudinal movement on the bolt, entering the expansible member at one end thereof and having an entering diameter equal to the diameter of the entrance end of the interior bore, said expanding member being adapted to act consecutively on different portions of the expansible member.

6. In an expansion bolt, the combination of a bolt, a wedge-shaped expanding member thereon, a soft metal expansible member engaged by the same of a material capable of being molded and forming a couple therewith, and hard metal collars at each side of the couple for confining the same therebetween.

7. In an expansion bolt, the combination of a bolt, a hard metal cone-shaped expanding member, a soft metal expansible member co-acting therewith, and hard metal washers at each side of the expanding member and expansible member, said hard metal washers extending radially beyond the expansible member.

8. In an expansion bolt, the combination of a bolt, a hard metal cone-shaped expanding member having ribs, a soft metal expansible member having slots adapted to engage the ribs, and a hard metal washer at each side of the expanding member and expansible member, said hard metal washers extending radially beyond the expansible member.

9. In an expansion bolt, the combination of a bolt, a hard metal expanding member, a soft metal expansible member, said expansible member having the form of a portion of a sphere obtained by two planes running parallel to each other and cutting the sphere on each side of the center, and hard metal washers at each side of the expanding member and soft metal expansible member, said hard metal washers extending radially beyond the expansible member.

10. An anchorage, comprising a bolt proper, an expanding member mounted on said bolt proper, an expansible member on said bolt proper and capable of being molded under pressure when entered by said expanding member, the diameter of the entering end of the expanding member initially in contact with said expansible member being less than the greatest diameter thereof, said expanding member successively increasing in diameter from said entering end, the thickness of the initially contacted portion of said expansible member being less than the greatest thickness thereof, the thickness and external diameter of said expansible member consecutively increasing away from the entering end of the expanding member, the entire expanded part of said expansible member contacting with said expanding member only at the completion of the expansion thereof, and collars at opposite sides of said expanding and said expansible member respectively, and having the approximate diameter as the greatest diameter of the expansible member, for confining the substance of the expansible member therebetween.

11. An anchorage, comprising a bolt proper, an expanding member mounted on said bolt proper, an expansible member on said bolt proper and capable of being molded under pressure when entered by said expanding member, the diameter of the entering end of the expanding member initially in contact with said expansible member being less than the greatest diameter thereof, said expanding member successively increasing in diameter from said entering end, the thickness of the initially contacted portion of said expansible member being less than the greatest thickness thereof, the thickness and external diameter of said expansible member consecutively increasing away from the entering end of the expanding member, the entire expanded part of said expansible member contacting with said expanding member only at the completion of the expansion thereof, collars at opposite sides of said expanding and said expansible member respectively, and having the approximate diameter as the greatest diameter of the expansible member, for confining the substance of the expansible member therebetween, said bolt being threaded, and locking means engaging the threads thereof, and being at opposite sides of said expanding and expansible members, respectively.

In testimony whereof, I have hereunto affixed my signature to this specification in the presence of the two undersigned witnesses.

GABRIEL E. ROHMER.

Witnesses:
FRED R. GARST,
FRANCIS BOORWELL.